(12) United States Patent
Hendren

(10) Patent No.: US 9,598,151 B1
(45) Date of Patent: Mar. 21, 2017

(54) BALLASTED HIGH STABILITY FLOATATION DEVICE

(71) Applicant: James Paul Hendren, Gravette, AR (US)

(72) Inventor: James Paul Hendren, Gravette, AR (US)

( * ) Notice: Subject to any disclaimer, the term of this patent is extended or adjusted under 35 U.S.C. 154(b) by 33 days.

(21) Appl. No.: 14/683,311

(22) Filed: Apr. 10, 2015

(51) Int. Cl.
*B63B 22/20* (2006.01)
*B29C 44/18* (2006.01)
*B29L 9/00* (2006.01)

(52) U.S. Cl.
CPC ............. *B63B 22/20* (2013.01); *B29C 44/18* (2013.01); *B29L 2009/00* (2013.01)

(58) Field of Classification Search
CPC .......... B63B 22/20; E02B 3/064; B29C 44/18
See application file for complete search history.

(56) References Cited

U.S. PATENT DOCUMENTS

| | | | |
|---|---|---|---|
| D196,402 S | 9/1963 | Brown | D71/1 |
| 3,448,709 A * | 6/1969 | Hardwick, Jr. | E02B 3/064 114/266 |
| D270,529 S | 9/1983 | Thompson | D12/316 |
| D283,220 S | 4/1986 | Collier | D12/316 |
| 4,655,156 A | 4/1987 | Svirklys et al. | 114/266 |
| D298,428 S | 11/1988 | Kendle, Jr. | D12/316 |
| 4,799,445 A | 1/1989 | Meriwether | 114/267 |
| 4,928,617 A | 5/1990 | Meriwether | 114/267 |
| 4,940,021 A * | 7/1990 | Rytand | E02B 3/064 114/263 |
| 4,974,538 A * | 12/1990 | Meriwether | B29C 63/22 114/267 |
| D366,023 S | 1/1996 | LeCat | D12/316 |
| 6,179,525 B1 | 1/2001 | Gruhn et al. | 405/219 |
| D442,137 S | 5/2001 | Coon | D12/316 |
| D496,624 S | 9/2004 | Hartman | D12/316 |
| 7,243,608 B2 | 7/2007 | Knight, Jr. et al. | 114/267 |
| D667,772 S | 9/2012 | Hendren | D12/316 |

* cited by examiner

Primary Examiner — Stephen Avila
(74) Attorney, Agent, or Firm — Keisling & Pieper PLC; David B. Pieper

(57) ABSTRACT

An improved flotation device using a molded casing including a concrete lower ballast core section and a foam upper buoyancy core section. A method of construction is taught including forming the casing, installing the core into the casing, transporting the device, and sealing the casing.

1 Claim, 3 Drawing Sheets

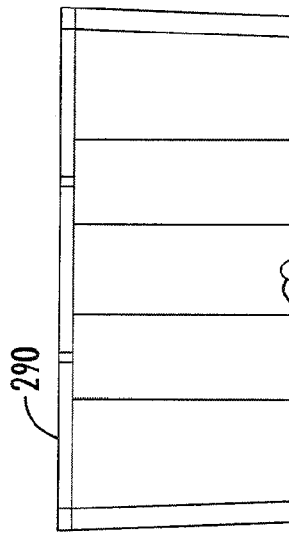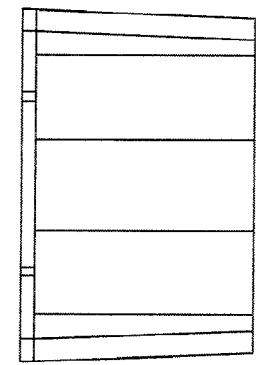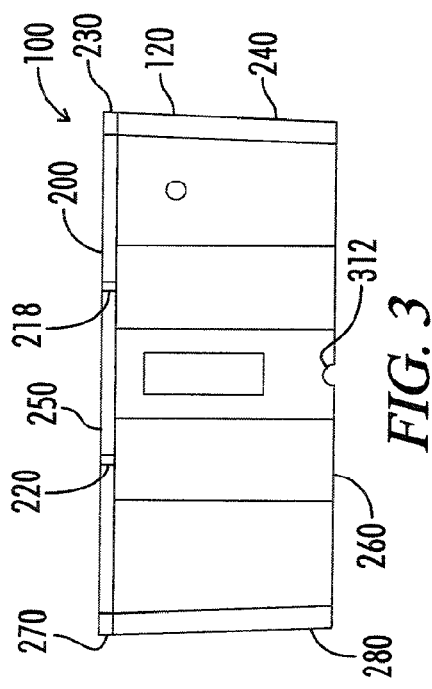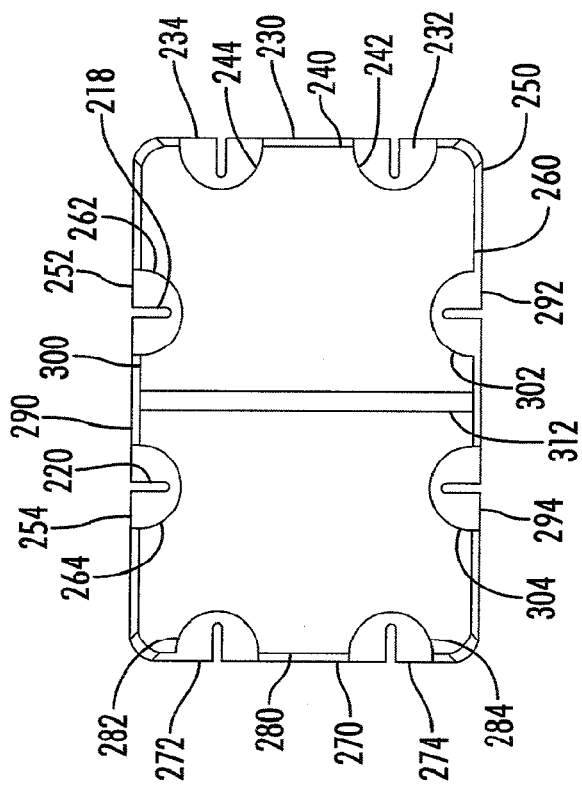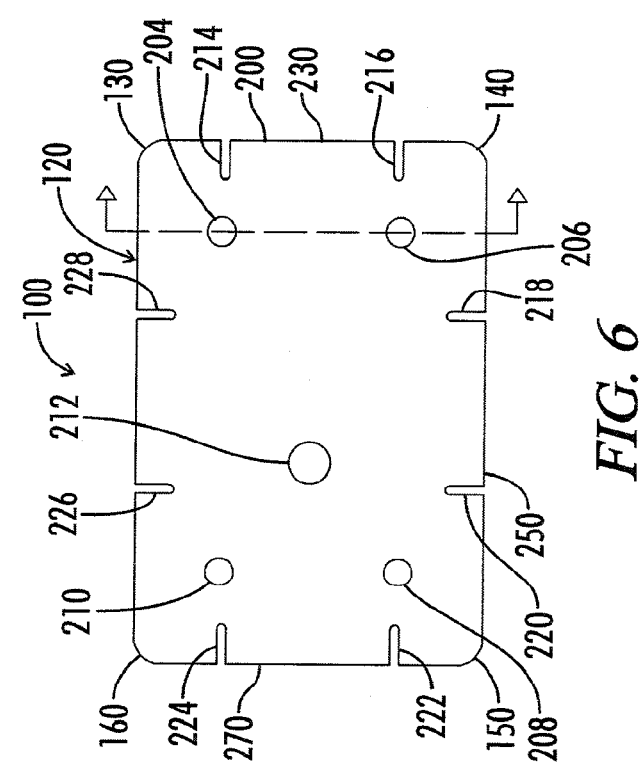

BALLASTED HIGH STABILITY FLOATATION DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in floatation devices. More particularly, the invention relates to improvements particularly suited for encased flotation devices such as those used under boat docks and walkways. In particular, the present invention relates to a polyethylene encased expanded polystyrene and concrete ballast core flotation device and method of construction of forming the casing with access points, installing and curing the concrete, molding the flotation foam, sealing all but one of the access points, transporting the semi-sealed float to the use location, and then threading in a sealing plug to the last access point to form a flotation device.

2. Description of the Known Art

As will be appreciated by those skilled in the art, floats are known in various forms. Patents disclosing information relevant to floats include: U.S. Pat. No. D667,772, issued to Hendren on Sep. 25, 2012 entitled Rotation molded dock float; U.S. Pat. No. D196402, issued to Brown September 1963; U.S. Pat. No. D270529, issued to Thompson on September 1983; U.S. Pat. No. D283220, issued to Collier April 1986; U.S. Pat. No. 4,655,156, issued to Svirklys et al. on April 1987; U.S. Pat. No. D298428, issued to Kendle, Jr. on November 1988; U.S. Pat. No. 4,799,445, issued to Meriwether on January 1989; U.S. Pat. No. 4,928,617, issued to Meriwether on May 1990; U.S. Pat. No. 4,974,538, issued to Meriwether on December 1990; U.S. Pat. No. D366023, issued to LeCat on January 1996; U.S. Pat. No. 6,179,525, issued to Gruhn et al. on January 2001; U.S. Pat. No. D442137, issued to Coon on May 2001; U.S. Pat. No. D496624, issued to Hartman on September 2004; and U.S. Pat. No. 7,243,608, issued to Knight et al. on July 2007. Each of these patents is hereby expressly incorporated by reference in their entirety.

From these prior references it may be seen that these prior art patents are very limited in their teaching and utilization, and an improved float is needed to overcome these limitations.

SUMMARY OF THE INVENTION

The present invention is directed to an improved flotation device using a casing and a multilayer core including a lower heavier ballast section and an upper higher buoyancy section. The term heavier and higher buoyancy are used comparatively for the two layers. In accordance with one exemplary embodiment of the present invention, a molded casing is provided using a concrete ballast core section and an expanded foam upper core section. Thus, the invention teaches an encased flotation device with a multiple layer core.

The present invention also teaches a method of construction including forming the casing, installing the core into the casing, transporting the device, and sealing the casing. Sealing the casing can be done before or after transporting the device.

Advantages of the present invention include a high strength, high quality, formed to fit construction of a floatation device. The device has high strength and durability in environmental conditions and is a consistent and repeatable construction for engineering calculations on load carrying capabilities.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 3 is a left side view thereof.

FIG. 4 is a front view thereof, the back view being the same.

FIG. 5 is a right side view thereof

FIG. 6 is a top view thereof

FIG. 7 is a bottom view thereof.

DETAILED DESCRIPTION OF THE INVENTION

Figure 1:
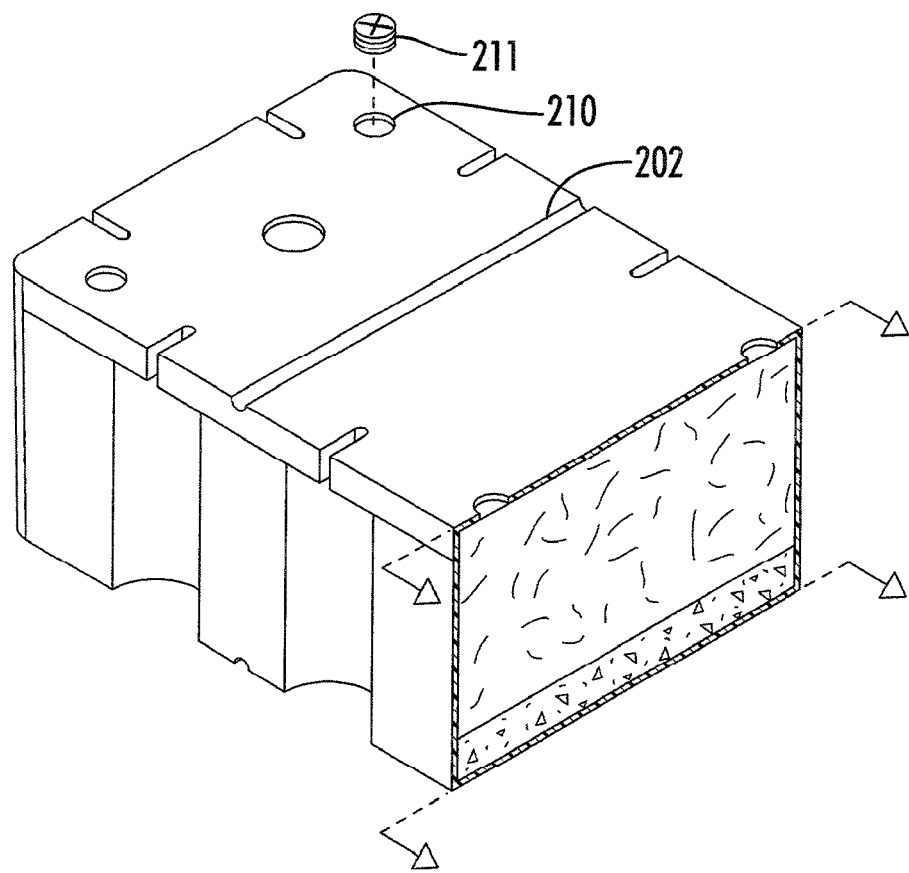
FIG. 1 is a perspective cut away view of a ballasted high stability floatation device.
Figure 2:
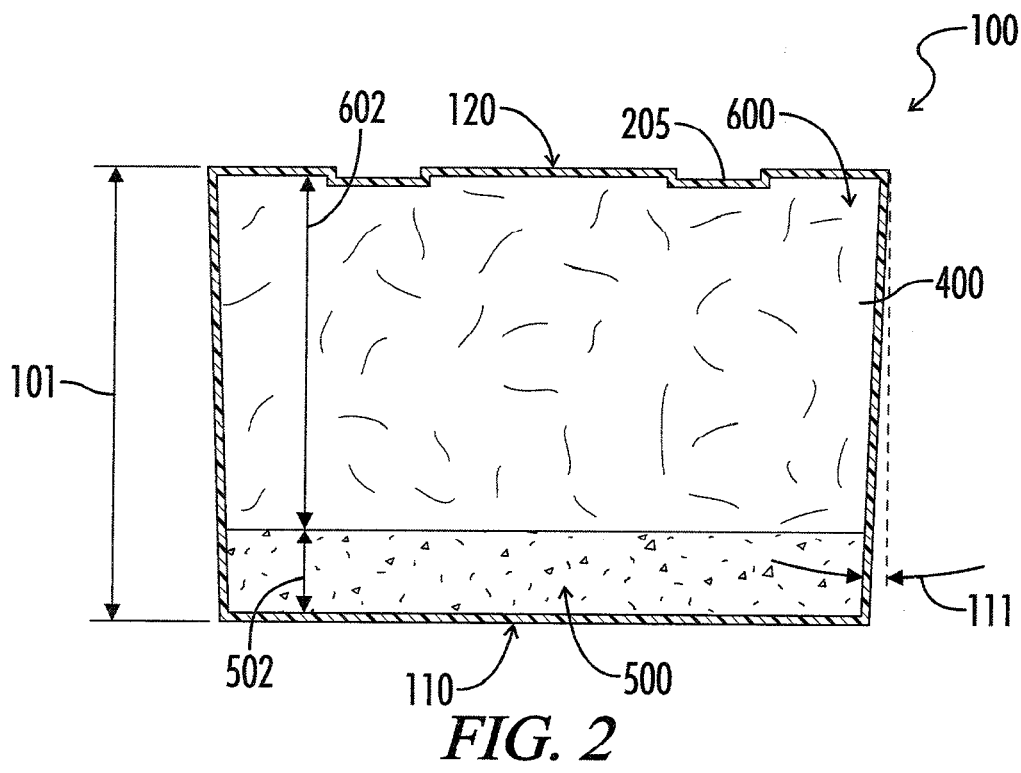
FIG. 2 is a cut away end view thereof.

As shown in FIGS. 1 though 7 of the drawings, one exemplary embodiment of the present invention is generally shown as a ballasted high stability floatation device 100. The device 100 is formed with a casing shell 110 defining a central cavity 400 holding a lower ballast core 500 and an upper molded in place expanded foam buoyancy core 600.

The casing shell 110 provides an armor effect across the environmental temperature spectrum and protects the concrete and foam buoyancy core 600 from physical harm such as physical contact, impacts, or gouging, and harmful environmental conditions such as sunlight, salt water, and freezing water intrusion. The casing shell 100 tends to flex and bend when impact loads are applied without puncturing providing a long life seal against environmental effects. The casing shell 100 also provides protection from water absorption and salt deterioration of the concrete in the core 500. Furthermore, during nondestructive use, the shell casing 100 protects the environment from the materials used in the cores 500, 600. In this manner, the casing shell 110 and dual cores 500, 600 provide an improved floatation device over those currently used.

In the preferred embodiment shown, the device has a height of sixteen inches, a width of twenty four inches, and a length of thirty six inches measured at the top of the device 100. The casing shell 110 utilizes a side wall section taper angle 111 to achieve a bottom width of 23.327 inches and a length of 35.090 inches by using a taper angle of approximately 1.2 degrees on the sides and approximately 1.6 degrees on the ends. This taper angle 111 allows the devices 100 to be adjacently positioned. This can be critical under flexible top surface applications to avoid producing undue forces on the device 100 with approximately two and a half to three degrees of top surface planar variation between the adjacent devices. This size is also optimal for small weight and shipping considerations but variation in the sizing can be easily accomplished with devices successfully built between 12 and 36 inches thick, 12 to 48 inches wide, and 36 to 96 inches long. The 16×24×36 size shown herein with a 2 inch thick ballast weighs between 150 and 200 pounds and can carry approximately 190 pounds before submersing. To calculate the floatation we can look at the 36×48×96 inch upper end of these sizes which can carry up to 5000 pounds minus the weight of the ballast core 500 and adjusting for replacing the floatation material with concrete. For exemplary purposes, we can use numbers for each cubic foot of concrete weighing 150 pounds and each cubic foot of foam providing 52 pounds of buoyancy. With this basis, an approximately 3 inch thick ballast core at 3×48×96 inches would weigh 1200 pounds. The remaining foam buoyancy core at 33×48×96 would provide 4583 pounds of buoyancy. Combining these numbers 4583−1200=3383 pounds of flotation before the device 100 is submerged. This provides ample carrying capability for non-submerged devices 100 with substantial increases in stability of the float device 100. Additionally, because the additional low positioned ballasting stabilizes the float 100 in rough water, these floats 100 provide more effective wave breaks than previously known float devices.

In the embodiment shown, the casing shell is formed from a shell body 120. The shell body 120 is formed from a 0.30 inch nominal thickness rotationally molded high density polyethylene. The continuous shell body 120 includes subsections defining a front right corner 130, front left corner 140, back left corner 150, back right corner 160, top surface wall section 200, front edge top wall section 230, front edge bottom wall section 240, left edge top wall section 250, left edge bottom wall section 260, back edge top wall section 270, back edge bottom wall section 280, right edge top wall section 290, and right edge bottom wall section 300.

The top surface wall section 200 is the main load carrying contact point for the device 100. The top surface wall section 200 can be designed with a small bifurcating semi-cylinder reinforcement 202 as shown in FIG. 1, or can be a smooth surface as shown in FIGS. 3 through 7. Installation of the concrete core 500 and foam core 600 and excess expansion discharge may be done through top surface wall section 200 using the first corner access aperture 204, second corner access aperture 206, third corner access aperture 208, fourth corner access aperture 210, and /or fifth central access aperture 212 as appropriate. In one embodiment, the central access aperture 212 is used to insert the concrete for the ballast core 500 which is then cured in place. The foam 600 is then also installed through the central access aperture 212 and steam is applied through each aperture 204, 206, 208, 210 to do the final expansion on the foam 600 to mold it in place. The corner access apertures 204, 206, 208, 210 also allow the steam to escape, or may also be used to apply additional steam as well. All but one of the central and corner access apertures 204, 206, 208, 210, 212 are plugged with a glued or welded permanent plug 205 after the foam is molded in place. In the preferred embodiment, one plug is left open until after shipping of the device 100 to its final location. As shown in FIG. 1, a threaded plug 211 is provided to be screwed in place after all of the atmospheric pressure variations of shipping have been completed.

Connections to the device may be done with a simple bolt connection using the front right edge slot 214, front left edge slot 216, left front edge slot 218, left back edge slot 220, back left edge slot 222, back right edge slot 224, right back edge slot 226, and right front edge slot 228. The sides of the device 100 are formed in a dual stack formation.

The front includes a front edge top wall section 230 extending from the top surface wall section 200 down to the front right clamping overhang 232 and the front left clamping overhang 234. Below the front edge top wall section 230 is the front edge bottom wall section 240 which is reinforced by the front right large bifurcating semi-cylinder reinforcement 242, and front left large bifurcating semi-cylinder reinforcement 244.

The left side includes the left edge top wall section 250 extending from the top surface wall section 200 down to the left front clamping overhang 252 and left back clamping overhang 254. Below the left edge top wall section 250 is the left edge bottom wall section 260 which is reinforced by the left front large bifurcating semi-cylinder reinforcement 262 and left back large bifurcating semi-cylinder reinforcement 264.

The back side includes the back edge top wall section 270 extending from the top surface wall section 200 down to the back left clamping overhang 272 and back right clamping overhang 274. Below the back edge top wall section 270 is the back edge bottom wall section 280 which is reinforced by the back left large bifurcating semi-cylinder reinforcement 282 and the back right large bifurcating semi-cylinder reinforcement 284.

The right side is formed from the right edge top wall section 290 extending from the top surface wall section 200 down to the right front clamping overhang 292 and the right back clamping overhang 294. Below the right edge top wall section 290 is the right edge bottom wall section 300 which is reinforced by the right front large bifurcating semi-cylinder reinforcement 302 and the right back large bifurcating semi-cylinder reinforcement 304.

The bottom surface wall section 310 provides the transportation support for the device 100 in addition to the protective aspects. The bottom surface wall section 310 includes a small bifurcating semi-cylinder reinforcement 312.

The top and bottom semi-cylinder reinforcement 202, 312 can be used for securing pipes or tubing across and between multiple adjacent devices 100 for forming a connecting retention frame to hold the devices 100 in position.

The central cavity 400 is formed by the shell body 120 and forms the shapes of the lower ballast core 500 and upper foam buoyancy core 600 during pouring, curing, and expansion.

The lower ballast core 500 is formed from a cured in place concrete having a lower thickness 502 of between two and three inches in the preferred embodiment. Thus, in the preferred embodiment the concrete is between one eighth (1/8 or 12.5%) and three sixteenth (3/16 or 18.75%) of the total height 101 of the device 100 with a desirable range centered around these percentages. Preferred values within the acceptable range include values from zero to one quarter of the device height with the upper limit defined by the desired carrying buoyancy of the device 100. Because the concrete weighs approximately 3 times more than the buoyancy of the foam used in the preferred embodiment, the upper limit is effectively 25% concrete and 75% foam. Note that the 2-3 inches of concrete provides a good starting point for comparing ballast percentage properties against the height of the device 100. Concrete 2-3 inches thick in a 24 inch high device provides an 8.3% to 12.5% ballast height. Contrast this with a 2-3 inch concrete height in a 36 inch high float still provides ballasting, but the percentage is dropped to 5.5% to 8.3% of the height.

The upper expanded foam buoyancy core 600 is formed from one hundred percent virgin high grade, one pound per cubic foot, molded in place expanded polystyrene foam having a thickness of between 12.1 and 12.4 inches in the preferred embodiment. Thus, the foam buoyancy core 600 has an upper thickness 602 of approximately twelve sixteenth (12.1/16 to 12.4/16 thickness) of the total height of the device 100. Values within the acceptable range for this thickness include the cavity height down to a lower limit that is again defined by the desired carrying buoyancy of the device 100.

Figure 8:
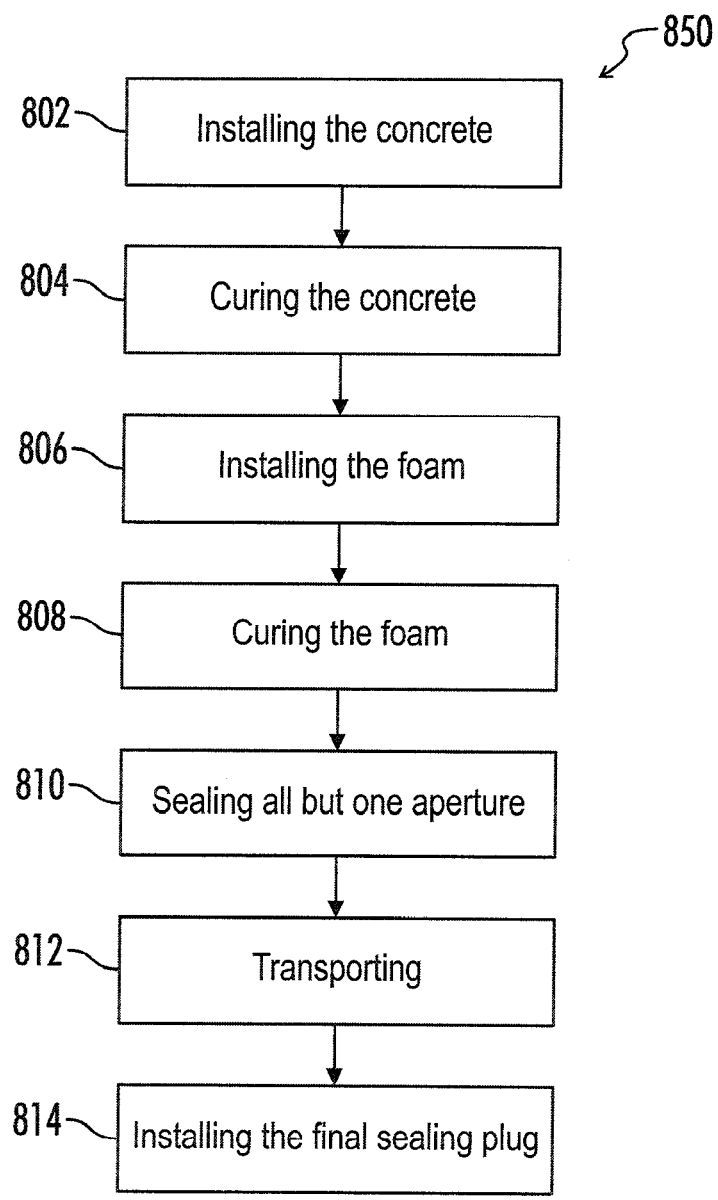
FIG. 8 is a flow chart of the method of construction.

FIG. 8 outlines the steps in the float construction method 850 of forming the casing 800 with access points, installing the concrete 802, curing the concrete 804, installing the foam 806, curing the foam 808, sealing all but one 810 of the access points, transporting 812 the semi-sealed float to the use location, and then installing a sealing plug 814 to the last access point to form a flotation device. Forming the casing 800 with access points is done with a rotational molding process. Installing the concrete 802 is simply a pour in place operation. Curing the concrete 804 can be as simple as a time cure or temperature/chemical accelerating agents may be used. Installing the foam 806 is done by pouring in the beads through one or more of the apertures. Curing the foam 808 is a simple steam process with steam inserted through each of the corner apertures and vented out of all of the apertures. Sealing all but one 810 of the access apertures can be done by any method, but we have found easy success in gluing or welding in place plugs 205 sized to the apertures. Transporting 812 the semi-sealed float to the use location is done with semi-trailers although any transportation method may be utilized. Installing a sealing plug 814 to the last access aperture to form a flotation device is done with a threaded plug 211 installed into threads molded into one of the corner apertures in the casing and may be sealed or left as an unsealed thread. The threaded plug 211 is done to allow for easy field installation of the last plug with a simple slot or Phillips type tool recess.

Note that these are not necessarily a fixed order of steps such that some of these steps may overlap other steps or occur in a different order. For example, curing the concrete may extend through all of the steps that occur after the installation of the concrete and may actually extend into the use of the device 100. Similarly, the all of the sealing of the apertures 810, 814 could be moved after the transporting 812, but we have found better quality control by sealing the majority of the apertures in the factory environment.

In this manner, the present invention teaches a polyethylene encased upper expanded polystyrene foam and lower concrete ballast flotation device 100 and the method for constructing this device.

Reference numerals used throughout the detailed description and the drawings correspond to the following elements:
Ballasted high stability floatation device 100
Total height 101
Casing shell 110
Continuous shell body 120
Front right corner 130
Front left corner 140
Back left corner 150
Back right corner 160
Top surface wall section 200
Small bifurcating semi-cylinder reinforcement 202
First corner access aperture 204
Permanent plug 205
Second corner access aperture 206
Third corner access aperture 208
Fourth corner access aperture 210
Threaded plug 211
Fifth central access aperture 212
Front right edge slot 214
Front left edge slot 216
Left front edge slot 218
Left back edge slot 220
Back left edge slot 222
Back right edge slot 224
Right back edge slot 226
Right front edge slot 228
Front edge top wall section 230
Front right clamping overhang 232
Front left clamping overhang 234
Front edge bottom wall section 240
Front right large bifurcating semi-cylinder reinforcement 242
Front left large bifurcating semi-cylinder reinforcement 244
Left edge top wall section 250
Left front clamping overhang 252
Left back clamping overhang 254
Left edge bottom wall section 260
Left front large bifurcating semi-cylinder reinforcement 262
Left back large bifurcating semi-cylinder reinforcement 264
Back edge top wall section 270
Back left clamping overhang 272
Back right clamping overhang 274
Back edge bottom wall section 280
Back left large bifurcating semi-cylinder reinforcement 282
Back right large bifurcating semi-cylinder reinforcement 284
Right edge top wall section 290
Right front clamping overhang 292
Right back clamping overhang 294
Right edge bottom wall section 300
Right front large bifurcating semi-cylinder reinforcement 302
Right back large bifurcating semi-cylinder reinforcement 304
Bottom surface wall section 310
Small bifurcating semi-cylinder reinforcement 312
Central cavity 400
Lower ballast core 500

Lower thickness 502
Upper expanded foam buoyancy core 600
Upper thickness 602
Forming the casing 800
Installing the concrete 802
Curing the concrete 804
Installing the foam 806
Curing the foam 808
Sealing all but one aperture 810
Transporting 812
Installing the final sealing plug 814
Float construction method 850

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A float apparatus, comprising:
   a casing shell defining a central cavity, the casing shell including a continuously molded shell body forming a bottom wall section, side wall section, and top wall section, the top wall section defining at least one access aperture;
   a lower ballast core positioned in the central cavity;
   an upper buoyancy core positioned above the ballast core in the central cavity; and
   the side wall including a vertical bifurcating semi-cylinder reinforcement.

* * * * *